J. H. THOMPSON.
Window-Screens.
No. 146,410. Patented Jan. 13, 1874.
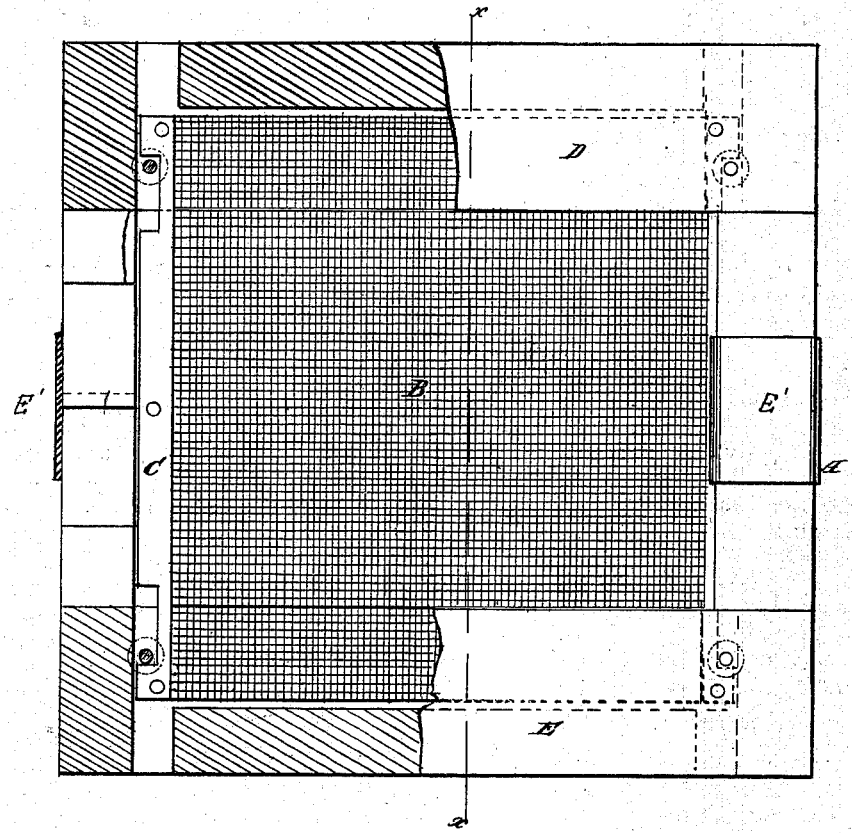
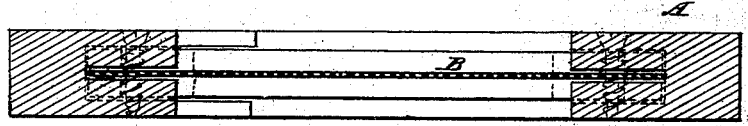
Witnesses:
P. C. Dieterich
O. Sedgwick
Inventor:
J. H. Thompson
Per Munn & Co.
Attorneys.

UNITED STATES PATENT OFFICE.

JOHN H. THOMPSON, OF FLEMINGTON, NEW JERSEY.

IMPROVEMENT IN WINDOW-SCREENS.

Specification forming part of Letters Patent No. 146,410, dated January 13, 1874; application filed September 20, 1873.

*To all whom it may concern:*

Be it known that I, JOHN H. THOMPSON, of Flemington, in the county of Hunterdon and State of New Jersey, have invented a new and useful Improvement in Extension Window-Screens, of which the following is a specification:

This invention relates to the construction of screens for windows, and consists in an adjustable frame by means of which the screen is adapted to windows of different sizes.

In the accompanying drawing, Figure 1 represents a front view. Fig. 2 is a cross-section taken on the line $x\ x$.

Similar letters of reference indicate corresponding parts.

A is the frame, the end pieces of which are grooved to receive the screen-cloth B, as seen in Fig. 2. The frame is made adjustable as to length, and the grooves are made deep in the top and bottom pieces, as seen in Fig. 2, and indicated by dotted lines in Fig. 1. The frame is made in two parts, the sides being constructed so that the parts lap past and slide on each other, so as to keep the edges of the screen-cloth tightly inclosed when the frame is extended. C C are strips inclosed by the sides, and forming a part thereof, which receive the screen-cloth, and to which the cloth is attached. These pieces are guides upon which the sides slide in extending the rods D and E of the frame from the middle. The screen-cloth is attached to these pieces C C. Each piece consists of two parts, which are fastened together with the screen-cloth between them, the end pieces only being grooved. The depth of the grooves in the ends of the frame determines the extent to which the frame may be extended without leaving an opening. The screen-cloth is preferably made of wire, but ordinary mosquito-netting may be used. This makes a most convenient screen for the windows of dwellings and other buildings, and supplies a want which has long been felt by the public. E′ E′ are clips which may be employed to retain the two parts of frame in position.

Having thus described my invention, I claim as new and desire to secure by Letters Patent—

The window-screen formed of grooved frame A and screen-holding frame C, the latter sliding within the former, in the manner described, to protect the wire.

JOHN H. THOMPSON.

Witnesses:
 T. B. MOSHER,
 ALEX. F. ROBERTS.